Jan. 23, 1968 R. T. HOOD 3,365,665
HALL CURRENT MEASURING APPARATUS HAVING A SERIES
RESISTOR FOR TEMPERATURE COMPENSATION
Filed July 27, 1964

INVENTOR.
RALPH T. HOOD
BY *signatures*
ATTORNEYS

United States Patent Office 3,365,665
Patented Jan. 23, 1968

3,365,665
HALL CURRENT MEASURING APPARATUS HAVING A SERIES RESISTOR FOR TEMPERATURE COMPENSATION
Ralph T. Hood, Cupertino, Calif., assignor to the United States of America as represented by the Administrator of the National Aeronautics and Space Administration
Filed July 27, 1964, Ser. No. 385,520
3 Claims. (Cl. 324—117)

ABSTRACT OF THE DISCLOSURE

A temperature compensating arrangement for compensating for changes in the Hall voltage of a Hall generator with changes in temperature of the generator, comprising a control circuit including a constant voltage source connected to the control electrodes of the Hall generator through a compensating resistor, such compensating resistor comprising the sole means for temperature compensation of the Hall generator.

---

The invention described herein may be manufactured and used by or for the Government of the United States of America for governmental purposes without the payment of any royalties thereon or therefor.

This invention relates to apparatus for measuring current and, more particularly, to the measurement of current by the use of a Hall-effect generator.

Methods of sensing and reading out current flow in high-voltage conductors, such as the power lines to extremely high energy arc-jet facilities, have been limited either in frequency response or amplitude sensitivity. One such limited prior method is the classical method of inserting a low-resistance block (instrument-shunt) in series with the power line and reading the voltage developed across the resistance by means of a divider network. The shunt method is also limited by the amount of power that can be dissipated in the shunt. Voltage isolation of the shunt necessarily reduces the signal to such a low value that high sensitivity galvanometers are required. Since high-sensitivity galvanometers cannot have good high frequency response one is forced to accept a compromise. Other prior approaches have also suffered from one or more of the enumerated problems.

Accordingly, it is an object of the invention to provide apparatus for measuring current in a manner having improved frequency response and improved amplitude sensitivity.

The solution provided by the invention employs a conventional Hall generator. As is well known in the art, such a device comprises a magnetic field responsive plate, preferably of a semi-conducting material. The plate is provided with two current supply terminals and with two output electrodes. When an input current is supplied to the terminals and the plate is properly oriented in a magnetic field an output voltage will be generated across the output electrodes. The output voltage is proportional to the magnetic field and therefore is a measure of the strength of the field and of course a measure of the energy which establishes the field, such as the current passing through a conductor. It has, of course, been known in the past that Hall generators can be used to measure current flow. One of the main problems, however, which has limited the use of the Hall generator for current measurement has been caused by the fact that the Hall generator is highly temperature responsive. In other words, the output from the Hall generator will vary considerably with variations in temperature even though the magnetic field remains constant. This problem has been solved according to the invention by utilizing the knowledge that the semiconductor Hall generator exhibits a negative temperature coefficient when a constant-current source is used and a positive temperature coefficient when a constant-voltage source is used. In other words, when the Hall generator is driven by a constant current source the output voltage from the generator decreases as the temperature increases. When the generator is driven by a constant voltage source the output from the generator increases with increase in temperature. It has been found, according to the invention, that if a resistor is inserted in series with the Hall generator driving circuit it is possible to arrive at a compromise between the two types of power sources and achieve adequate thermal compensation. In addition, it has been found that the specific required resistance necessary for thermal compensation over a specified range of temperatures can be calculated from the basic equation for the output of a Hall generator.

Accordingly, an additional object of the invention is to provide measuring apparatus including a Hall generator wherein the thermal coefficient of the generator is reduced substantially to zero over an appreciable temperature range.

A further object of the invention is to provide measuring apparatus comprising a Hall generator and a control circuit therefor containing a compensating resistor.

A further object of the invention is to provide an improved apparatus for measuring current with improved isolation characteristics.

Another object of the invention is to provide measuring apparatus involving a Hall generator and comprising potentiometer circuitry for resistive nulling.

Other and further objects and features of advantage will be apparent from the following detailed description wherein reference is made to the accompanying drawings in which.

Figure 1:
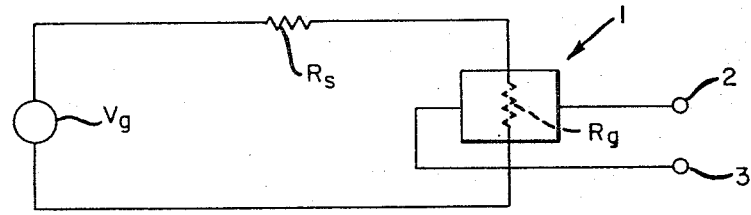
FIGURE 1 is a schematic circuit diagram used in explaining the calculation for obtaining the required magnitude of resistance.

Referring in more detail to the drawings, FIG. 1 discloses a schematic circuit diagram showing a conventional Hall generator 1 having an internal resistance $R_g$. A constant voltage power supply $V_g$, supplies the current for the Hall generator. The Hall generator includes output terminals 2 and 3 across which the output voltage $V_h$ can be measured. As will be hereinafter described in detail the control circuit includes a compensating resistor $R_s$.

Figure 2:
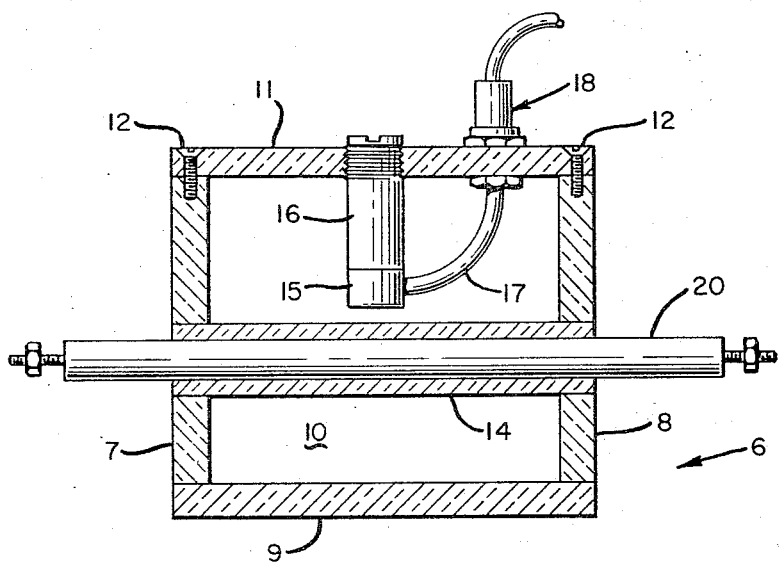
FIGURE 2 is a cross section view showing the construction of apparatus for employing the invention.

A preferred physical arrangement for the apparatus is shown in FIG. 2. The apparatus comprises a box 6 of dielectric material such as Lucite. The box 6 is made of end walls 7 and 8, a bottom wall 9, and a pair of side walls 10 (only 1 being shown in the drawing). The box comprises a removable top wall 11 which is held in place by screws 12. The end walls 7 and 8 are apertured to receive a Lucite tube 14 having its ends bonded in the apertures in the end walls. Thus, a completely closed chamber is formed, and in practice the chamber is preferably filled with transformer oil. The apparatus includes a conventional Hall generator 15 connected to the lower end of a Lucite supporting rod 16 which is in turn attached to the top 11. The wiring for the Hall generator can be carried in a cable 17 to a conventional plug and socket unit 18 mounted in the top 11 and thence out to the associated apparatus. The Lucite supporting rod 16 is threaded in the top 11 so that the exact spacing of the Hall generator from the Lucite tube 14 can be adjusted. The plate of the Hall generator is positioned with the plane of the plate parallel to and passing through the axis of the tube 14. A metal rod 20 is positioned in the tube 10 and connected in the circuit whose current is to be measured. The current flow through the tube 20 creates a magnetic field which causes a voltage output from the Hall generator in a manner well known in the art.

As previously explained, the reason why Hall generators have not been used more fully in current measurement is that they are sensitive to temperature changes. Such detrimental temperature sensitivity has been overcome according to the invention by the inclusion of the compensating resistance $R_s$ shown in FIG. 1, and more specifically a resistance having a particular value. The reason for the resistance and its particular value are arrived at in the following manner. The plate of the Hall generator is made of a material, for example, Indium Antiminide, such that if the Hall generator is driven by a constant voltage source it will have a positive temperature coefficient, and if driven by a constant current source the generator will have a negative temperature coefficient. It has been found that if a particular value of resistance is inserted in series with the constant voltage source $V_g$ in FIG. 2 a compromise between constant voltage and constant current results so that the output of the Hall generator will be independent of temperature.

In more detail, the reason for using the resistance is as follows. The equation for the output of a Hall generator is:

$$V_h = \frac{I_c c_h B b}{A} \quad (1)$$

where:

$V_h$ = output voltage (open circuit)
$I_c$ = control current (driving current)
$c_h$ = Hall coefficient of the generator material
$B$ = magnetic flux
$b$ = width of generator
$A$ = cross-sectional area of the generator.

In the constant voltage operation we see from Equation 1 we can rewrite the equation as:

$$V_h = \frac{E_g}{R_g} \frac{c_h B b}{A} \quad (2)$$

in other words representing the control current $I_c$ by its voltage across the generator $E_g$ divided by its internal resistance $R_g$.

Now it is a characteristic of the material used that both the Hall coefficient and the internal resistance change with temperature. Furthermore, they both exhibit an inverse relationship to temperature but their rates of change differ from one another. Thus, in Equation 2: $E_g$, $B$, $b$ and $A$ all remain constant with changing temperature but $R_g$ and $c_h$ do not. It happens that $R_g$ changes more rapidly than $c_h$ so that increasing temperature will cause the quantity $E_g c_h B b / R_g A$ to become larger since $c_h$ is in the numerator and will decrease less with increasing temperature. Thus, when the Hall generator is driven with a constant voltage source it will have a positive temperature coefficient; that is, the voltage output of the generator will increase with increasing temperature, under a constant magnetic flux condition.

In the constant current mode the equation $$V_h = \frac{I_c c_h B b}{A} = \frac{E_g}{R_g} \frac{c_h B b}{A}$$

now has three variables because in order to maintain a constant $E_g/R_g = I_c$, $E_g$ will have to decrease as $R_g$ decreases with temperature. The decrease in $E_g$ together with the decrease in $c_h$ will more than offset the decrease in $R_g$ and will decrease the entire quantity. Thus, when the Hall generator is driven with a constant current source it will have a negative temperature coefficient; that is, the voltage output of the generator will decrease with increasing temperature, under a constant magnetic flux condition.

Therefore, by inserting a series resistor with a constant voltage supply we obtain the following beneficial results. As $R_g$ decreases, with temperature increase, more current will attempt to pass through the generator and therefore through the series resistor. The current increase through the series resistor will cause more voltage to be dropped across it and therefore the $E_g$ will be decreased. Therefore, if the value of the series resistor ($R_s$) is properly selected it will cause the particular decrease in $E_g$ which will cooperate with the decrease in $c_h$ to cancel any change in output caused by a decrease in the resistance $R_g$.

The equation for determining the specific resistance necessary for thermal compensation over a specified range of temperatures is derived from the basic Equation 1 for the output of a Hall generator.

If Equation 1 is differentiated with respect to temperature T, $$\frac{dV_h}{dT} = \frac{c_h B b}{A} \frac{dI_c}{dT} + \frac{I_c B b}{A} \frac{dc_h}{dT} \quad (3)$$

For the desired condition where $V_h$ does not change with temperature, Equation 3 becomes $$c_h \frac{dI_c}{dT} = -I_c \frac{dc_h}{dT} \quad (4)$$

The parameter $dc_h/dT$ may be determined experimentally from the output voltage change with temperature for constant control current. From Equation 3

$$\left(\frac{dV_h}{dT}\right)_{I_c=\text{constant}} = \frac{I_c B d}{A} \frac{dc_h}{dT} \quad (5)$$

or $$\frac{dc_h}{dT} = \frac{A}{I_c B b}\left(\frac{dV_h}{dT}\right)_{I_c=\text{constant}} \quad (6)$$

The parameter $dI_c/dT$ may be determined from the Hall generator excitation circuit, shown in FIG. 1 having a constant voltage source $V_g$, for which circuit $$I_c = \frac{V_g}{R_s + R_g} \quad (7)$$

Differentiating Equation 7 with respect to temperature $$\frac{dI_c}{dT} = \frac{-V_g}{(R_s + R_g)^2} \frac{dR_g}{dT} \quad (8)$$

where $dR_g/dT$ may be readily measured for any given Hall generator.

Substituting Equations 1, 6, and 8 into Equation 4, we obtain $$\frac{V_g}{(R_g+R_s)} \frac{V_h}{I_c} \frac{dR_g}{dT} = \left(\frac{dV_h}{dT}\right)_{I_c=\text{constant}} \quad (9)$$

The solution for $(R_g+R_s)^2$ is $$(R_g+R_s)^2 = \frac{(V_g/I_c)(dR_g/dT)V_h}{(dV_h/dT)_{I_c=\text{constant}}} \quad (10)$$

But, since $V_g/I_c = (R_g+R_s)$, Equation 10 becomes $$(R_g+R_s) = V_h \frac{dR_g/dT}{(dV_h/dT)_{I_c=\text{constant}}} \quad (11)$$

Therefore $$R_s = \frac{dR_g/dT}{(dV_h/dT)_{I_c=\text{constant}}} V_h - R_g \quad (12)$$

Where the values to be taken for $V_h$ and $R_g$ are those which apply at the operating temperature about which compensation is to be made.

Using Equation 12 the necessary compensating resistance may be computed for any particular Hall generator, using only easily measurable parameters characteristic of the particular Hall generator.

Figure 3:
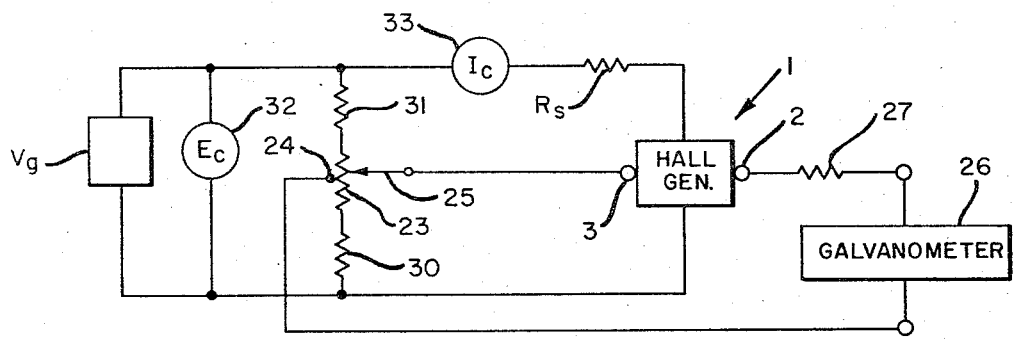
FIGURE 3 is a circuit diagram showing an actual circuit employed in using the invention in practice and including a resistive nulling arrangement.

FIG. 3 is a circuit diagram similar to FIG. 1 but showing a potentiometer arrangement for resistive nulling. FIG. 3, as in FIG. 1, discloses a constant voltage source $V_g$, a Hall generator 1 having output terminals 2 and 3, and a compensating resistance $R_s$. In addition, the practical embodiment shown in FIG. 3 includes a potentiometer comprising a resistance 23, a fixed tap 24 connected to the center of the resistance and a movable arm 25. The center tap 24 is conected to one side of a galvanometer 26, the other side of which is connected to the terminal 2 through a damping resistance 27. The movable arm 25 is conected to the terminal 3. A pair of nulling resistances 30 and 31 are connected on opposite sides of the potentiometer resistance 23 to place the potentiometer resistance 23 in parallel with the Hall generator. The embodiment of FIG. 3 also preferably includes a voltmeter 32 and an ammeter 33. The potentiometer is for resistive nulling in accordance with the following procedure. The mechanical zero of the galvanometer is located. Then after the Hall generator is energized the output of the galvanometer is returned to its zero reading by adjusting the potentiometer.

The sensitivity of the apparatus may be adjusted by changing the magnitude of the constant supply voltage $V_g$ or by changing the recording galvanometer 26. In a specific construction according to the invention an oscillograph galvanometer was used, and with a Hall generator supply voltage of about 3 volts, the Hall effect ammeter provided a sensitivity of about one inch deflection of galvanometer trace for each 1,000 amps. of current through the conductor 20. The distance from the center of the conductor to the Hall effect generator was approximately 1.9 inch. The conductor 20 was 1″ diameter copper rod. Since the frequency response of the Hall generator was substantially flat the response of the system was limited only by the recording galvanometer which, by reason of the invention, can be a relatively low-sensitivity, high-frequency-response type. The specific galvanometer used had a natural frequency of 225 c.p.s., as compared to a natural frequency of the order of 6 c.p.s. for the galvanometer required for use with the instrument shunt technique.

Although preferred embodiments of the present invention are shown and described herein, it is to be understood that modifications may be made therein without departing from the spirit and scope of the invention as set forth in the appended claims. For example, it should be understood that although the invention has been described with specific reference to measuring current, it is applicable to measurement of magnetic fields, per se, and any parameters such as current which bear a known relation to a related magnetic field.

Having thus described the invention, what is claimed as new and desired to be secured by Letters Patent is:

1. In measuring apparatus having a Hall generator, a control circuit comprising a substantially constant voltage power supply and a compensating resistor in series with said Hall generator, and the value of said resistor being equal to $$\frac{dR_g/dT}{(dV_h/dT)_{I_c=\text{constant}}}V_h - \sqrt{R_g}$$

where
$R_g$ = resistance of the Hall generator,
$T$ = temperature,
$V_h$ = the output voltage of the Hall generator,
$dR_g/dT$ = the temperature rate of change of the Hall generator resistance, and
$(dV_h/dT)_{I_c=\text{constant}}$ = the temperature rate of change of the Hall generator voltage using a constant current power supply.

2. A current measuring apparatus for measuring large values of current which aparatus includes,
a current carrying conductor through which the large current to be measured is adapted to be carried,
a Hall-effect generator a spaced distance from the conductor positioned in the magnetic flux field of the current carrying conductor, said generator including a pair of control terminals and a pair of output terminals,
a power supply having a constant voltage output,
a compensating resistor,
means connecting the constant voltage output to the control terminals of said Hall-effect generator through said compensating resistor for the sole compensation of changes in Hall voltage output with changes in temperature of the Hall-effect generator,
the value of the compensating resistor being substantially equal to, $$\frac{dR_g/dT}{(dV_h/dT)_{I_c=\text{constant}}}V_h - R_g$$

where:
$R_g$ = resistance of the Hall generator,
$T$ = temperature,
$V_h$ = the output voltage of the Hall-effect generator,
$dR_g/dT$ = the temperature rate of change of the Hall-effect generator resistance, and
$(dV_h/dT)_{I_c=\text{constant}}$ = the temperature rate of change of the Hall-effect generator voltage using a constant current power supply,
a potentiometer including a resistance in parallel with said constant-voltage power supply,
a low sensitivity, high frequency response type galvanometer, and
means conecting the galvanometer to the output terminals of the Hall-effect generator through a portion of the potentiometer resistance to compensate for the resistive null voltage of the Hall-effect generator, the galvanometer providing an indication of the current flowing through the current carrying conductor.

3. The current measuring apparatus as defined in claim 2 wherein said galvanometer has a natural frequency of approximately 225 cycles per second.

References Cited
UNITED STATES PATENTS 2,957,109  10/1960  White et al. _____ 324—45 XR

FOREIGN PATENTS 1,131,798  6/1962  Germany.

OTHER REFERENCES

Borneman, E. H.: Basic Course in Semiconductors and Technology, 1963, pub. by Westinghouse Semiconductor Div., pp. 9–6 and 9–7.

Sauber, J. W.: "Audio Frequency Measurements Using the Hall Effect," The Right Angle, February 1964, pp. 4 and 5.

RUDOLPH V. ROLINEC, *Primary Examiner.*

E. F. KARLSEN, *Assistant Examiner.*